United States Patent
Derbeko et al.

(10) Patent No.: US 9,009,444 B1
(45) Date of Patent: Apr. 14, 2015

(54) SYSTEM AND METHOD FOR LUN CONTROL MANAGEMENT

(71) Applicant: EMC Corporation, Hopkinton, MA (US)

(72) Inventors: Philip Derbeko, Modiin (IL); Arieh Don, Newton, MA (US); Anat Eyal, Tel Aviv (IL); Kevin F. Martin, Dracut, MA (US); Richard A. Trabing, Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 195 days.

(21) Appl. No.: 13/631,897

(22) Filed: Sep. 29, 2012

(51) Int. Cl.
G06F 12/00 (2006.01)
G06F 11/00 (2006.01)

(52) U.S. Cl.
CPC .................. *G06F 11/006* (2013.01)

(58) Field of Classification Search
USPC ............ 711/113, 135, 152, 203, 206; 712/16, 712/223, 225
See application file for complete search history.

(56) References Cited

U.S. PATENT DOCUMENTS

| | | | |
|---|---|---|---|
| 7,730,274 B1* | 6/2010 | Usgaonkar | 711/163 |
| 8,301,811 B1* | 10/2012 | Wigmore et al. | 710/74 |
| 8,675,557 B2* | 3/2014 | Le | 370/328 |
| 2002/0133735 A1* | 9/2002 | McKean et al. | 714/5 |
| 2004/0139196 A1* | 7/2004 | Butler et al. | 709/225 |
| 2008/0147934 A1* | 6/2008 | Nonaka et al. | 710/74 |
| 2010/0318637 A1* | 12/2010 | Ly et al. | 709/221 |

\* cited by examiner

*Primary Examiner* — Reba I Elmore
(74) *Attorney, Agent, or Firm* — Brian J. Colandreo; Mark H. Whittenberger; Holland & Knight LLP

(57) ABSTRACT

A method, computer program product, and computing system for receiving a reservation for a LUN from Host A, wherein the LUN is defined within a data array. A lock for the LUN is defined as Host A. A write request is received for the LUN from Host B. The lock for the LUN is defined as Transitioning A to B. The write request is delayed for a defined period of time.

21 Claims, 3 Drawing Sheets

SYSTEM AND METHOD FOR LUN CONTROL MANAGEMENT

TECHNICAL FIELD

This disclosure relates to LUN systems and, more particularly, to systems and methods for LUN management.

BACKGROUND

Storing and safeguarding electronic content is of paramount importance in modern business. Accordingly, various systems may be employed to protect such electronic content.

The use of high-availability data arrays is increasing in popularity, wherein each data array may be configured to serve a plurality of hosts (e.g., servers). Typically, data arrays are apportioned into a plurality of LUNs (i.e., logical drives) that are accessed by and/or assigned to hosts. Additionally, hosts may be configured in an active or a passive fashion, wherein a passive host is on standby mode ready to be called into duty in the event that the active host fails. Unfortunately, issues may arise concerning what host (the active host or the passive host) controls a particular LUN.

SUMMARY OF DISCLOSURE

In a first implementation, a computer-implemented method includes receiving a reservation for a LUN from Host A, wherein the LUN is defined within a data array. A lock for the LUN is defined as Host A. A write request is received for the LUN from Host B. The lock for the LUN is defined as Transitioning A to B. The write request is delayed for a defined period of time.

One or more of the following features may be included. If Host A does not contest defining the lock for the LUN as Transitioning A to B during the defined period of time, the lock for the LUN may be defined as Host B. The write request received for the LUN from Host B may be effectuated.

If Host A does contest defining the lock for the LUN as Transitioning A to B during the defined period of time, the lock for the LUN may be defined as Transitioning B to A. A cache associated with Host A may be flushed. A cache associated with Host B may be flushed. The LUN, Host A and Host B may be placed into degrade mode.

Host A and Host B may be in a cluster. Host A may be an active host and Host B may be a passive host.

In another implementation, a computer program product resides on a computer readable medium that has a plurality of instructions stored on it. When executed by a processor, the instructions cause the processor to perform operations including receiving a reservation for a LUN from Host A, wherein the LUN is defined within a data array. A lock for the LUN is defined as Host A. A write request is received for the LUN from Host B. The lock for the LUN is defined as Transitioning A to B. The write request is delayed for a defined period of time.

One or more of the following features may be included. If Host A does not contest defining the lock for the LUN as Transitioning A to B during the defined period of time, the lock for the LUN may be defined as Host B. The write request received for the LUN from Host B may be effectuated.

If Host A does contest defining the lock for the LUN as Transitioning A to B during the defined period of time, the lock for the LUN may be defined as Transitioning B to A. A cache associated with Host A may be flushed. A cache associated with Host B may be flushed. The LUN, Host A and Host B may be placed into degrade mode.

Host A and Host B may be in a cluster. Host A may be an active host and Host B may be a passive host.

In another implementation, a computing system includes at least one processor and at least one memory architecture coupled with the at least one processor, wherein the computing system is configured to perform operations including receiving a reservation for a LUN from Host A, wherein the LUN is defined within a data array. A lock for the LUN is defined as Host A. A write request is received for the LUN from Host B. The lock for the LUN is defined as Transitioning A to B. The write request is delayed for a defined period of time.

One or more of the following features may be included. If Host A does not contest defining the lock for the LUN as Transitioning A to B during the defined period of time, the lock for the LUN may be defined as Host B. The write request received for the LUN from Host B may be effectuated.

If Host A does contest defining the lock for the LUN as Transitioning A to B during the defined period of time, the lock for the LUN may be defined as Transitioning B to A. A cache associated with Host A may be flushed. A cache associated with Host B may be flushed. The LUN, Host A and Host B may be placed into degrade mode.

Host A and Host B may be in a cluster. Host A may be an active host and Host B may be a passive host.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
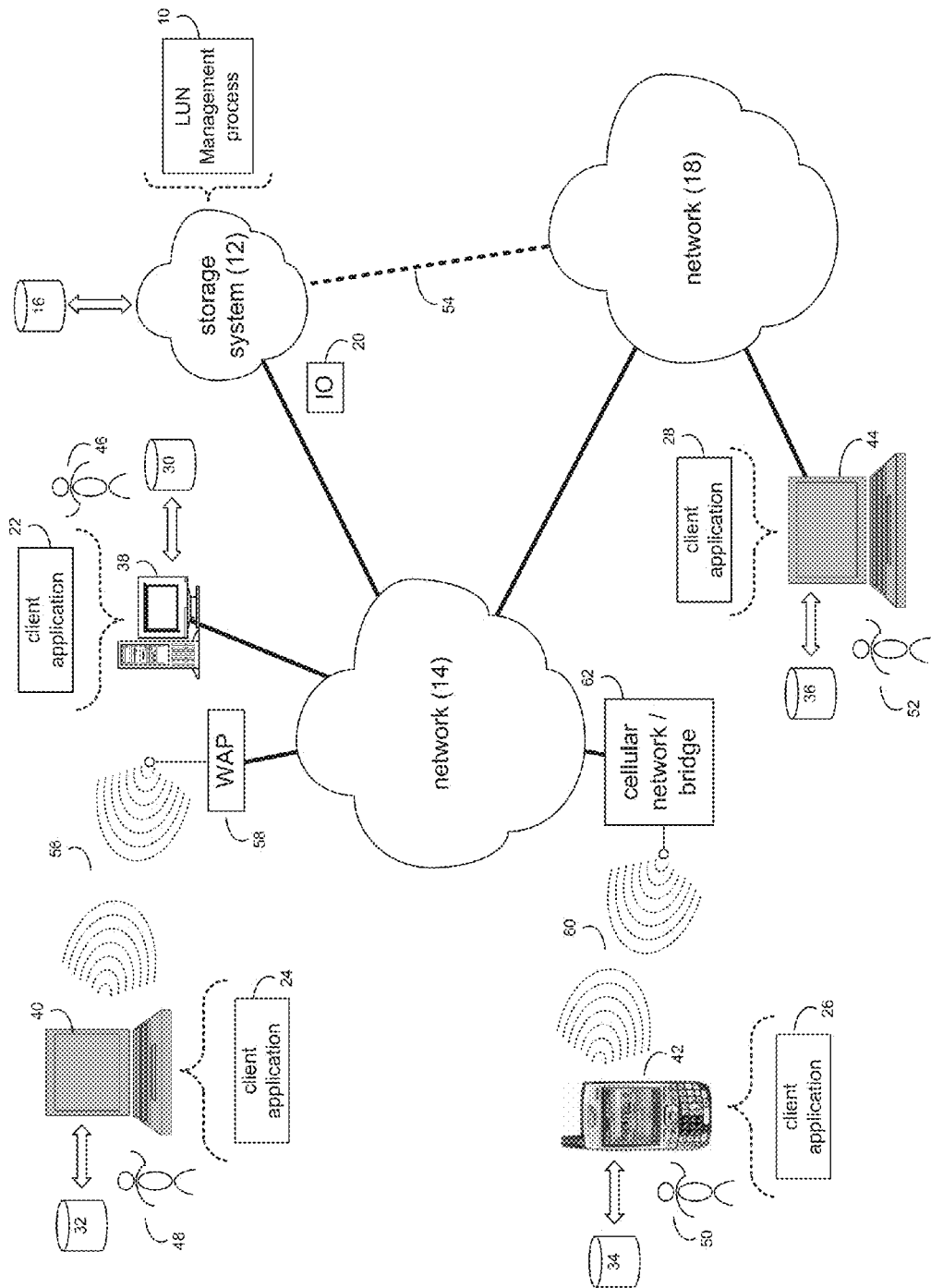
FIG. 1 is a diagrammatic view of a storage system and a LUN management process coupled to a distributed computing network.

System Overview:

Referring to FIG. 1, there is shown LUN management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™ Unix, or a custom operating system, for example.

The instruction sets and subroutines of LUN management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
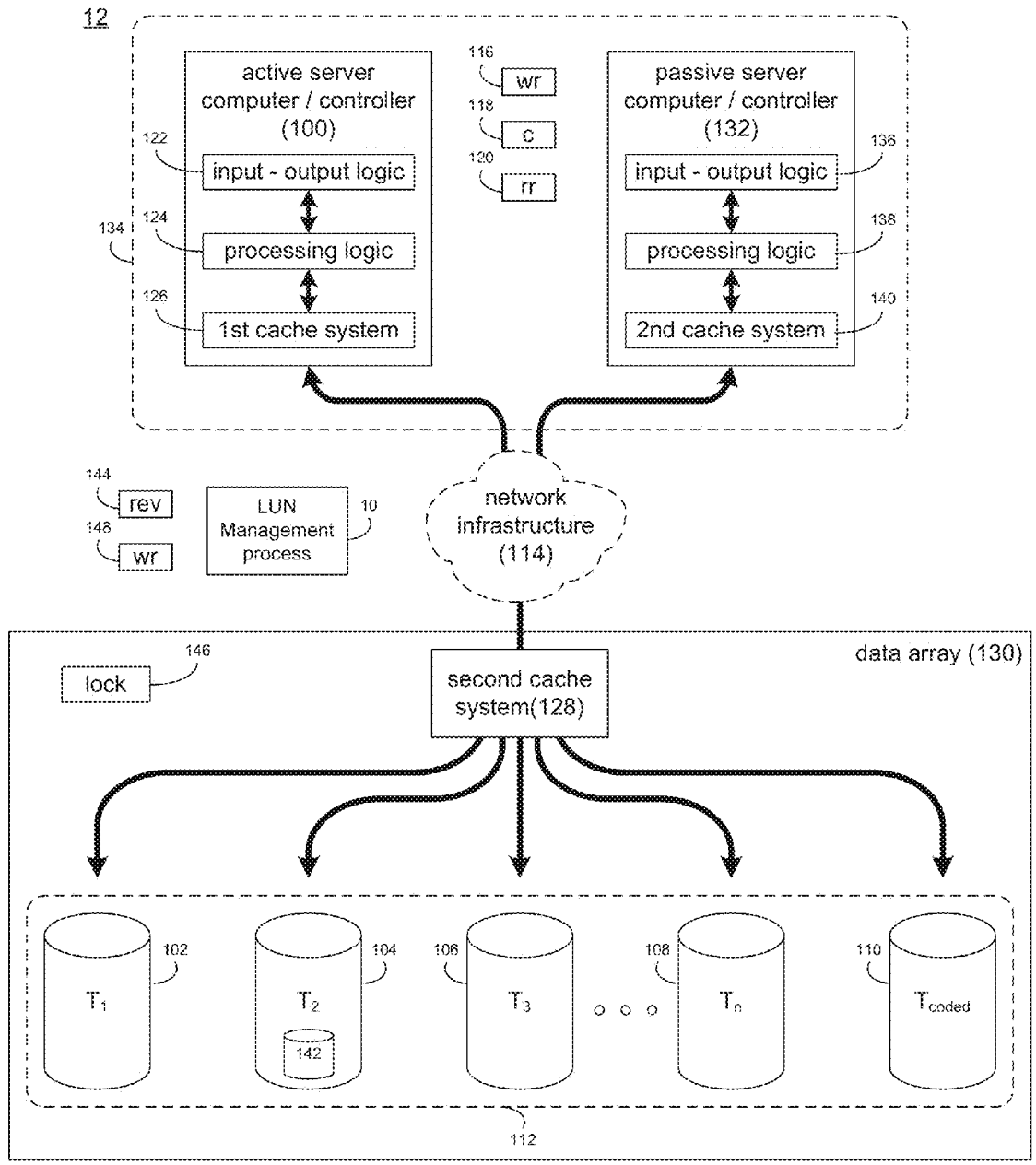
FIG. 2 is a diagrammatic view of the storage system of FIG. 1.

Referring also to FIG. 2, storage system 12 may include active server computer/controller 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which active server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which active server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. active server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of LUN management process 10. The instruction sets and subroutines of LUN management process 10, which may be stored on a storage device (e.g., storage device 16) coupled to active server computer/controller 100, may be executed by one or more processors (not shown) and one or more memory architectures (not shown) included within active server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when active server computer/controller 100 is configured as an application server, these IO requests may be internally generated within active server computer/controller 100. Examples of IO request 20 may include but are not limited to data write request 116 (i.e. a request that content 118 be written to storage system 12) and data read request 120 (i.e. a request that content 118 be read from storage system 12).

Active server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of active server computer/controller 100, content 118 to be written to storage system 12 may be received by input-output logic 122 (e.g. from network 14 and/or network 18) and processed by processing logic 124. Additionally/alternatively and when active server computer/controller 100 is configured as an application server, content 118 to be written to storage system 12 may be internally generated by active server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of LUN management process 10, which may be stored on storage device 16 included within storage system 12, may be executed by one or more processors (not shown) and one or more memory architectures (not shown) included within storage system 12. Accordingly, in addition to being executed on active server computer/controller 100, some or all of the instruction sets and subroutines of LUN management process 10 may be executed by one or more processors (not shown) and one or more memory architectures (not shown) included within data array 130.

Figure 3:
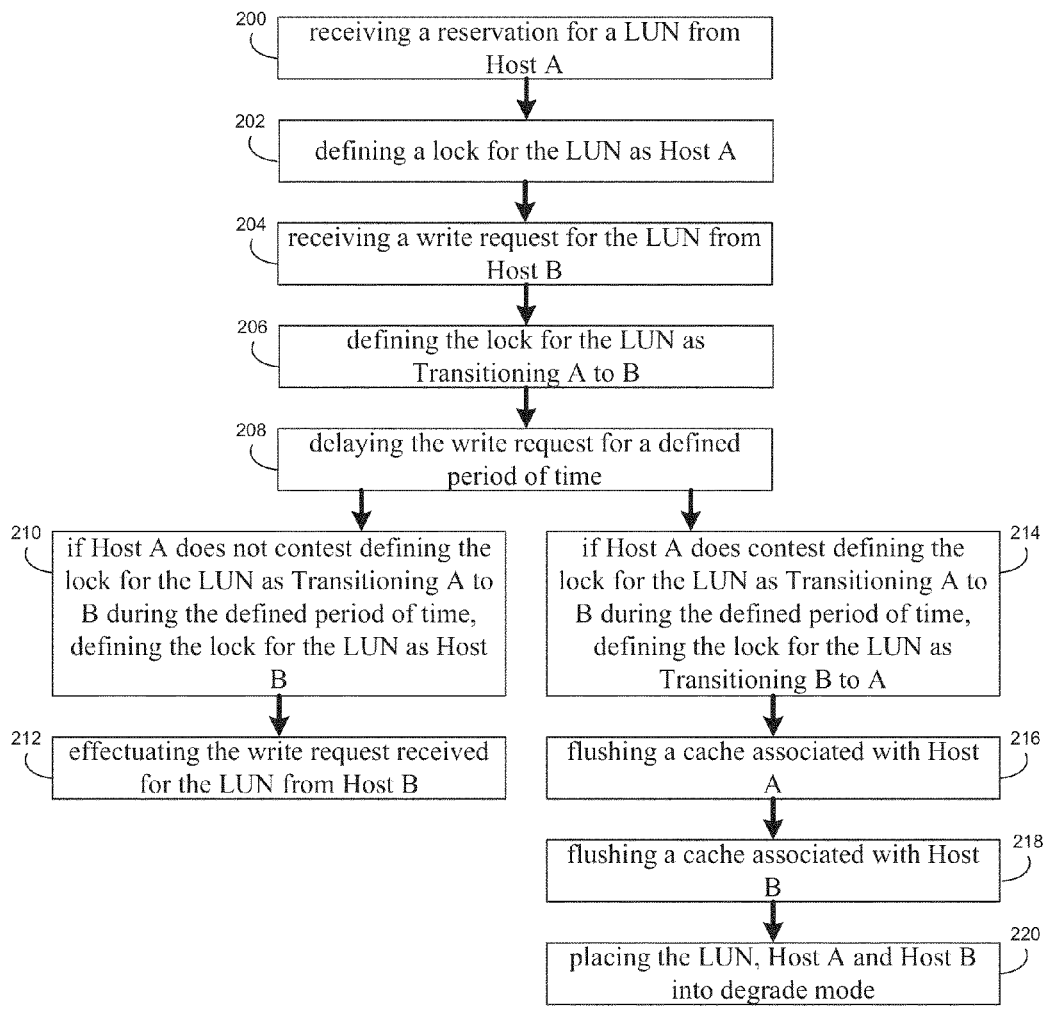
FIG. 3 is a flow chart of one implementation of the LUN management process of FIG. 1.

The LUN Management Process:

Referring also to FIG. 3, assume that passive server computer/controller 132 is configured to be activated by LUN management process 10 in the event of a failure of active server computer/controller 100. Accordingly, active server computer/controller 100 may be configured as an active host within cluster 134 and passive server computer/controller 132 may be configured as a passive host within cluster 134.

Passive server computer/controller 132 may include input-output logic 136 (e.g., a network interface card or a Host Bus Adaptor (HBA)), processing logic 138, and second cache system 140. Examples of second cache system 140 may include but are not limited to a volatile, solid-state, cache memory system (e.g., a dynamic RAM cache memory system) and/or a non-volatile, solid-state, cache memory system (e.g., a flash-based, cache memory system). The instruction sets and subroutines of LUN management process 10 may also be executed by one or more processors (not shown) and one or more memory architectures (not shown) included within passive server computer/controller 132.

Assume that when initially started, LUN 142 (which is defined within data array 130) is not assigned to a host. Further, assume that upon booting, Host A (e.g., active server computer/controller 100) wants to control LUN 142. Accordingly, Host A (e.g., active server computer/controller 100) may generate reservation 144 that may be provided to LUN management process 10. LUN management process 10 may receive 200 reservation 144 for LUN 142 from Host A (e.g., active server computer/controller 100).

Upon receiving 200 reservation 144, LUN management process 10 may process the same and may define 202 a lock associated with LUN 140 (e.g. lock 146) as "Host A". Specifically, lock 146 may be configured to define the current status of ownership of (in this example) LUN 142. For example, in the event that a host wanted to know what host currently controlled LUN 142, the inquisitive host may simply read the status of lock 146, which (in this example) would define the current owner of LUN 142 as Host A (e.g., active server computer/controller 100).

Assume for illustrative purposes that the combination of Host A (e.g., active server computer/controller 100) and LUN 142 is operating properly and Host A (e.g., active server computer/controller 100) is executing various write requests (e.g. write request 116) and various read requests (e.g., read request 120). However, assume that for some unknown reason, Host B (e.g., passive server computer/controller 132) attempts to write to LUN 142. Accordingly, Host B (e.g., passive server computer/controller 132) may process a write request (e.g. write request 148) for LUN 142. Accordingly, LUN management process 10 may receive 204 write request 148 for LUN 142 from Host B (e.g., passive server computer/controller 132).

Upon receiving 204 write request 148, LUN management process 10 may process the same and may define 206 lock 146 for LUN 142 as "Transitioning A to B". Sensing that something may be wrong, LUN management process 10 may delay 208 the processing of write request 148 for a defined period of time. An example of such a defined period of time may be 10 seconds, wherein this defined period of time is sized to allow sufficient time for the host that originally controlled LUN 142 to contest the new status (e.g. "Transitioning A to B") of lock 146.

When a host controls a particular LUN, the host may be configured to poll the status of the lock associated with the LUN at defined intervals that are shorter than the above-described defined period of time. For example, assume for illustrative purposes that once write request 148 concerning LUN 142 is received 204 by LUN management process 10, the processing of write request 148 may be delayed by 10 seconds. Further assume that Host A (e.g., active server computer/controller 100) is configured so that, once in control of LUN 142, Host A (e.g., active server computer/controller 100) may read the status of lock 146 every 2 seconds to assure that Host A (e.g., active server computer/controller 100) is still in control of LUN 142. Accordingly, by sizing the polling interval (e.g. every 2 seconds) so that it is substantially shorter than the delay associated with processing write request 148 (e.g. 10 seconds), in the event that the taking of control of LUN 142 by Host B (e.g., passive server computer/controller 132) from Host A (e.g., active server computer/controller 100) was unjustified, Host A (e.g., active server computer/controller 100) will have substantial time to contest such a takeover of control.

If Host A (e.g., active server computer/controller 100) does not contest defining 206 lock 146 for LUN 142 as "Transitioning A to B" during the defined period of time (e.g., 10 seconds), LUN management process 10 may define 210 lock 146 for LUN 142 as "Host B". Accordingly, assume for illustrative purposes that Host A (e.g., active server computer/controller 100) has suffered a catastrophic failure. Accordingly, cluster software (not shown) associated with cluster 134 may sense the failure of Host A (e.g., active server computer/controller 100) and may switch Host B (e.g., passive server computer/controller 132) from a passive to an active mode. Accordingly, Host B (e.g., passive server computer/controller 132) may begin to utilize LUN 142 and may process read and write requests concerning the same. Accordingly, since in this example, Host A (e.g., active server computer/controller 100) is dead, Host A (e.g., active server computer/controller 100) will not contest defining lock 146 for LUN 142 as "Transitioning A to B" during the defined period of time (e.g., 10 seconds). Therefore, LUN management process 10 may define 210 lock 146 for LUN 142 as "Host B", thus effectuating the transition of Host B (e.g., passive server computer/controller 132) from a passive mode to an active mode. Further, LUN management process 10 may effectuate 212 the processing of write request 148 received 204 for LUN 142 from Host B (e.g., passive server computer/controller 132).

Conversely, if Host A (e.g., active server computer/controller 100) does contest defining 206 lock 146 for LUN 142 as "Transitioning A to B" during the defined period of time (e.g., 10 seconds), LUN management process 10 may define 214 lock 146 for LUN 142 as "Transitioning B to A". Accordingly, assume for illustrative purposes that Host A (e.g., active server computer/controller 100) has not suffered any catastrophic failure and no reassignment was made by the cluster software (not shown) associated with cluster 134 with respect to active/passive roles. Accordingly, assume that Host B (e.g., passive server computer/controller 132) is acting in a rogue manner and is trying to "steal" control of LUN 142.

As discussed above, assume that Host A (e.g., active server computer/controller 100) is configured so that, once in control of LUN 142, Host A (e.g., active server computer/controller 100) reads the status of lock 146 every 2 seconds to assure that Host A (e.g., active server computer/controller 100) maintains control of LUN 142. Since the delay associated with processing write request 148 is (in this example) 10 seconds, Host A (e.g., active server computer/controller 100) will discover during that 10 second delay that Host B (e.g., passive server computer/controller 132) is attempting to take control of LUN 142 from Host A (e.g., active server computer/controller 100). Accordingly, LUN management process 10 may define 214 lock 146 for LUN 142 as "Transitioning B to A".

Sensing that something is wrong, LUN management process 10 may flush 216 a cache (e.g., first cache 126) associated with Host A, and may flush 218 a cache (e.g., second cache 140) associated with Host B. Upon sensing the control of LUN 142 rapidly transitioning from Host A to Host B and then back to Host A, LUN management process 10 may suspect that something is wrong (e.g., within Host A, Host B and/or the clustering software) and may place 220 LUN 142, Host A (e.g., active server computer/controller 100) and/or Host B (e.g., passive server computer/controller 132) into a degrade performance mode (such as a mode that minimizes data corruption by bypassing first cache 126 and/or second cache 140).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving a reservation for a LUN from Host A, wherein the LUN is defined within a data array;
defining a lock for the LUN as Host A;
receiving a write request for the LUN from Host B;
defining the lock for the LUN as Transitioning A to B;
delaying the write request for a defined period of time; and
if an issue is sensed during transition, degrading a performance mode of at least one of the LUN, Host A, and Host B to minimize data corruption.

2. The computer-implemented method of claim 1 further comprising:

if Host A does not contest defining the lock for the LUN as Transitioning A to B during the defined period of time, defining the lock for the LUN as Host B.

3. The computer-implemented method of claim 2 further comprising:
effectuating the write request received for the LUN from Host B.

4. The computer-implemented method of claim 1 further comprising:
if Host A does contest defining the lock for the LUN as Transitioning A to B during the defined period of time, defining the lock for the LUN as Transitioning B to A.

5. The computer-implemented method of claim 4 further comprising:
flushing a cache associated with Host A;
flushing a cache associated with Host B; and
placing the LUN, Host A and Host B into degrade mode.

6. The computer-implemented method of claim 1 wherein Host A and Host B are in a cluster.

7. The computer-implemented method of claim 1 wherein Host A is an active host and Host B is a passive host.

8. A computer program product residing on a non-transitory computer readable medium having a plurality of instructions stored thereon which, when executed by a processor, cause the processor to perform operations comprising:
receiving a reservation for a LUN from Host A, wherein the LUN is defined within a data array;
defining a lock for the LUN as Host A;
receiving a write request for the LUN from Host B;
defining the lock for the LUN as Transitioning A to B;
delaying the write request for a defined period of time; and
if an issue is sensed during transition, degrading a performance mode of at least one of the LUN, Host A, and Host B to minimize data corruption.

9. The computer program product of claim 8 further comprising instructions for:
if Host A does not contest defining the lock for the LUN as Transitioning A to B during the defined period of time, defining the lock for the LUN as Host B.

10. The computer program product of claim 9 further comprising instructions for:
effectuating the write request received for the LUN from Host B.

11. The computer program product of claim 8 further comprising instructions for:
if Host A does contest defining the lock for the LUN as Transitioning A to B during the defined period of time, defining the lock for the LUN as Transitioning B to A.

12. The computer program product of claim 11 further comprising instructions for:
flushing a cache associated with Host A;
flushing a cache associated with Host B; and
placing the LUN, Host A and Host B into degrade mode.

13. The computer program product of claim 8 wherein Host A and Host B are in a cluster.

14. The computer program product of claim 8 wherein Host A is an active host and Host B is a passive host.

15. A computing system including at least one processor and at least one memory architecture coupled with the at least one processor, wherein the computing system is configured to perform operations comprising:
receiving a reservation for a LUN from Host A, wherein the LUN is defined within a data array;
defining a lock for the LUN as Host A;
receiving a write request for the LUN from Host B;
defining the lock for the LUN as Transitioning A to B;
delaying the write request for a defined period of time; and
if an issue is sensed during transition, degrading a performance mode of at least one of the LUN, Host A, and Host B to minimize data corruption.

16. The computing system of claim 15 further configured to perform operations comprising:
if Host A does not contest defining the lock for the LUN as Transitioning A to B during the defined period of time, defining the lock for the LUN as Host B.

17. The computing system of claim 16 further configured to perform operations comprising:
effectuating the write request received for the LUN from Host B.

18. The computing system of claim 15 further configured to perform operations comprising:
if Host A does contest defining the lock for the LUN as Transitioning A to B during the defined period of time, defining the lock for the LUN as Transitioning B to A.

19. The computing system of claim 18 further configured to perform operations comprising:
flushing a cache associated with Host A;
flushing a cache associated with Host B; and
placing the LUN, Host A and Host B into degrade mode.

20. The computing system of claim 15 wherein Host A and Host B are in a cluster.

21. The computing system of claim 15 wherein Host A is an active host and Host B is a passive host.

* * * * *